W. F. H. BRAUN.
GANG MOWER.
APPLICATION FILED JULY 29, 1916.
1,260,631.
Patented Mar. 26, 1918.
2 SHEETS—SHEET 1.
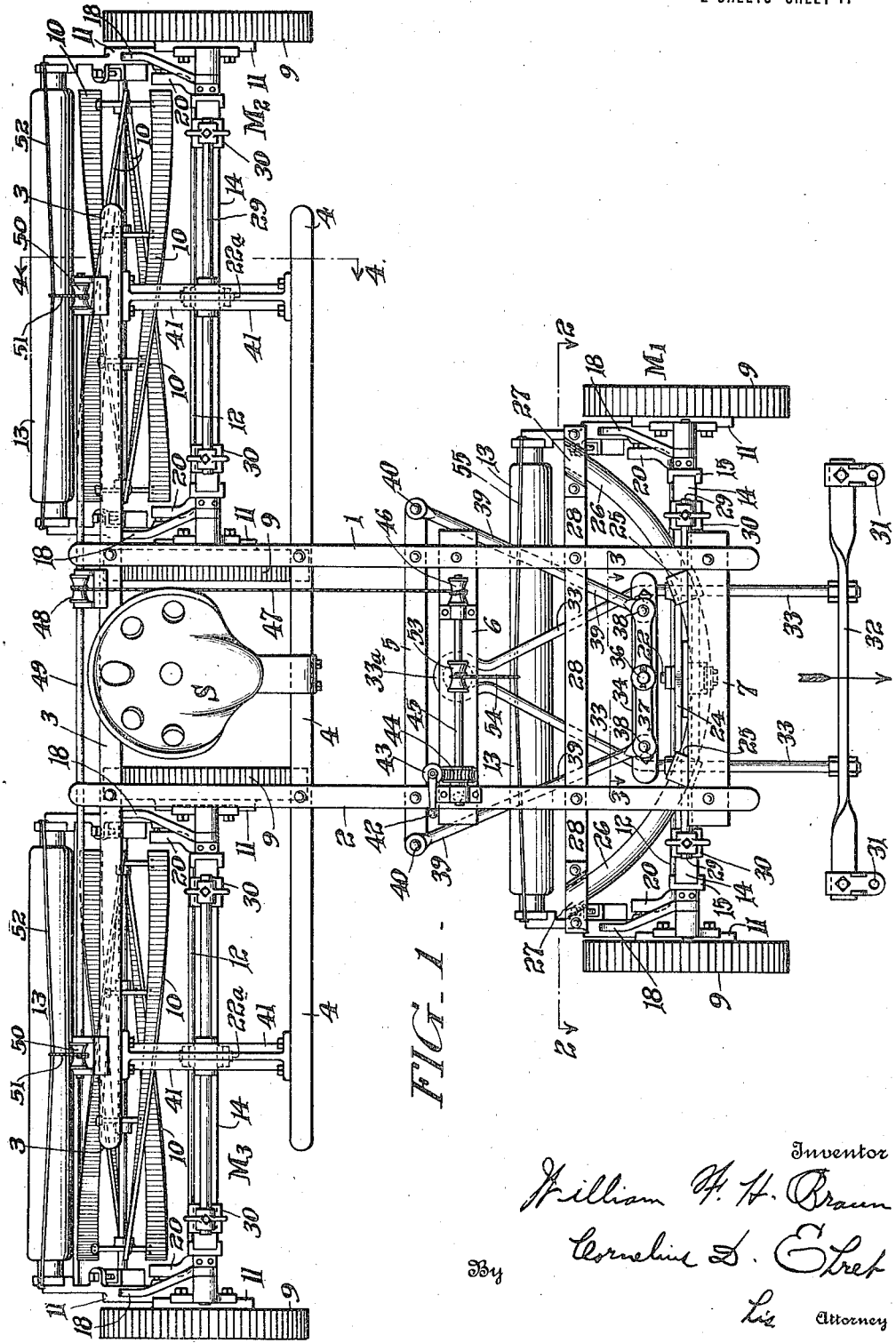

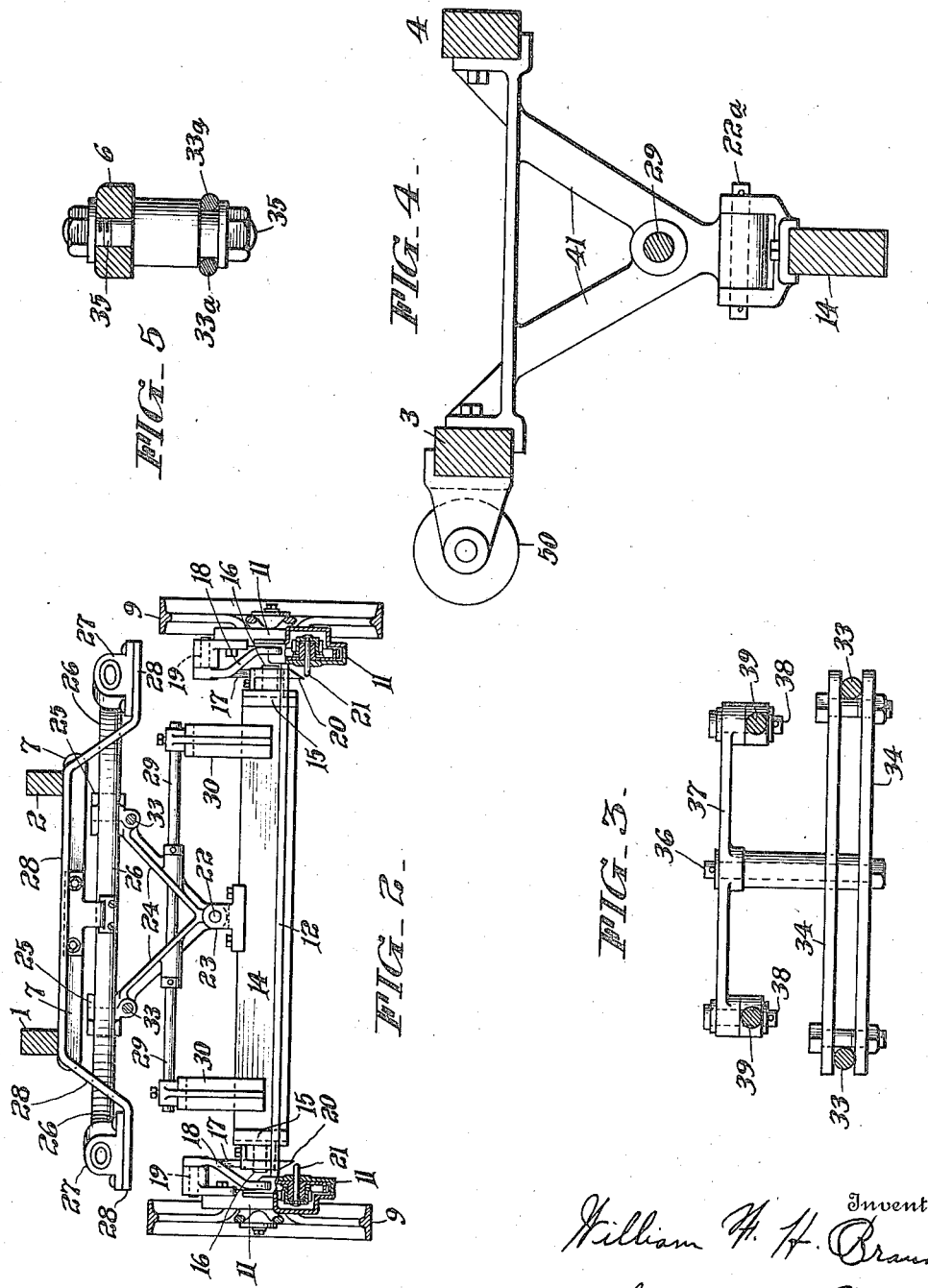

UNITED STATES PATENT OFFICE.

WILLIAM F. H. BRAUN, OF PHILADELPHIA, PENNSYLVANIA, ASSIGNOR TO PENNSYLVANIA LAWN MOWER WORKS, OF PHILADELPHIA, PENNSYLVANIA, A CORPORATION OF PENNSYLVANIA.

GANG-MOWER.

1,260,631.  Specification of Letters Patent.  Patented Mar. 26, 1918.

Application filed July 29, 1916. Serial No. 111,984.

*To all whom it may concern:*

Be it known that I, WILLIAM F. H. BRAUN, a citizen of the United States, residing in the city of Philadelphia, county of Philadelphia, and State of Pennsylvania, have invented certain new and useful Improvements in Gang-Mowers, of which the following is a specification.

My invention relates to apparatus for mowing lawns and the like, and relates particularly to a gang mower comprising a plurality of individual lawn mowers operated in unison.

It is the object of my invention to provide in a lawn mower comprised of leading and trailing mower units, that is, comprised of mower units arranged in different rows or ranks, means whereby the gang mower as a whole may take a curvilinear path or turn a corner while cutting a swath whose width shall be great and nearly equal to the sum of the widths of the swaths of the individual mower units.

To these ends, in the example illustrated, the individual mowers forming one row or rank always maintain the same position with relation to each other, that is, they coöperate as a unit with the mower unit or units of another row or rank, which latter may take angular positions with respect to the first named row or rank, interconnecting means being provided for compelling all of the mower units to maintain certain angular relations both in straight forward movement and when taking curvilinear paths.

For an illustration of one of the forms my invention may take, reference may be had to the accompanying drawings, in which:

Figure 1 is a top plan view of a gang mower embodying my invention.

Fig. 2 is a vertical sectional view, some parts in elevation, taken on the line 2—2 of Fig. 1.

Fig. 3 is a fragmentary view, on enlarged scale, some parts in elevation, corresponding with a section taken on the line 3—3 of Fig. 1.

Fig. 4 is a vertical sectional view, on enlarged scale, of parts of the apparatus corresponding with a section taken on the line 4—4 of Fig. 1.

Fig. 5 is a fragmentary view showing the king bolt and associated parts.

Referring to the drawings, S is a seat for the operator or driver secured upon the frame comprising the side sills 1 and 2 and the cross sills 3, 4, 5, 6 and 7.

To this frame are secured the three mower units $M^1$, $M^2$ and $M^3$.

Each of these mower units comprises the ground or lawn engaging wheels 9 driving rotary cutters 10 through gearing of any suitable type inclosed in the gear casings 11 interconnected by the usual tie rods 12. And associated with each cutter or cutter mechanism is a ground engaging roller 13, each cutter mechanism and roller 13 being swingable or rotatable about an axis co-incident with the axis of the driving wheels 9.

With the front or leading mower unit $M^1$, Figs. 1 and 2, is associated a wooden or other bar 14 having secured at each end the metal bearing 15 in which a pin 16 has pivotal movement. Upon each pin 16 is mounted a bell crank lever having the arms 17 and 18, of which the arm 17 has at its lower end a hole receiving the pin 16 which is secured in and to the arm 17. This bell crank lever is pivoted by pin 19 upon the gear casing 11, the free end of the arm 18 engaging and pressing downwardly upon the gear casing operatively to thrust the cutter mechanism toward the ground or lawn. This bell crank arrangement is described and claimed in my prior application Serial Number 94,097.

On each bearing 15 is secured a cam member 20 adapted to engage and thrust laterally the clutch pin 21 to throw the cutter mechanism out of gear with the driving wheels 9. This cam member and the clutch operated thereby are described in my prior application Serial Number 94,097.

The other mower units $M^2$ and $M^3$ may, as indicated, be similarly provided with the bell crank lever and the clutch mechanism above described.

The mower unit $M^1$ is pivoted upon the horizontal pin 22 whereby it partakes of transverse pivotal movement to accommodate itself to irregularities in the lawn surface. Pin 22 is carried by the bearing block 23 secured upon the transverse bar 14. And upon the pin 22 is pivoted the V-shaped member 24 which carries at its upper ends the U-shaped blocks 25 embracing and guided upon the arcuate bar or tube 26 secured at its ends in blocks 27 carried by the member 28 secured to the frame sills 1 and 2.

Carried by the V-member 24 is the rod 29 carrying at its ends on opposite sides of the pivot 22 a downwardly extending bifurcated or forked member 30 loosely embracing the cross bar 14 and guiding the same in its movements in a vertical plane upon the pivot 22.

At 31, 31 may be attached the shafts or other means for hitching a horse or attaching other pulling or driving means. Forward movement in the direction of the arrow is communicated to the bar 32 secured upon the draft rods 33 which extend through the upper ends of the V-member 24, Fig. 2, and are then clamped and held between the bars 34, 34, Figs. 1 and 3, and then converge and form the eye $33^a$, Figs. 1 and 5, embracing the king bolt 35 carried by the frame member 6, the king bolt 35 forming a center about which the front or leading mower unit $M^1$ is movable on a vertical axis.

Secured upon the members 34 is the vertically extending pivot shaft or pin 36, Figs. 1 and 3, upon which is disposed for pivotal movement in a horizontal plane the arm or member 37 carrying at its opposite ends the pivot pins 38 upon which are pivoted the links, levers or bars 39 which are in turn pivoted at their rear ends at 40 to the member 5 extending transversely to and secured to the frame sills 1 and 2.

As indicated in Fig. 1, the other mower units $M^2$ and $M^3$ are provided with some parts described in connection with the unit $M^1$, these parts being indicated by similar reference characters and are principally the bars 14 and 29, and the members 30 in addition to the cam members 20 and the bell crank members heretofore referred to.

As indicated in Figs. 1 and 4, the members 14 of the rear mower units are mounted for transverse pivotal movement upon the horizontal pivot pins $22^a$ carried by the bracket members 41 secured to the frame sills 3 and 4, the bars or members 29 extending through the brackets 41 as indicated.

Within reach of the driver or operator is the hand crank 42 which drives a worm 43 which in turn drives the worm gear 44 secured upon the shaft 45 upon which is secured the winding drum 46 upon which is wound the cord or chain 47 which extends to the rear and is wound upon the drum or pulley 48 which in turn rotates the shaft 49 which rotates the spools or drums 50 upon which are wound the cords or chains 51 attached to the bails 52 which are attached to the cutter mechanism frames to lift the same free from the lawn. Upon the shaft 45 is secured the second cord pulley or drum 53 upon which is wound the cord 54 attached to the bail 55 of the front or leading mower unit $M^1$ for raising the cutter mechanism thereof free from the lawn, it being understood that rotation of the crank 42 will cause all the cutter mechanisms to be simultaneously lifted, and in such movement the cam members 20 engage the clutch pins and unclutch the cutter mechanism from the driving wheels 9, as explained in my prior application Serial Number 94,097.

The operation is as follows:

With the cutters 10 and rollers 13 lowered into operative relation with respect to the lawn, the gang mower is moved forwardly in the direction of the arrow in Fig. 1, and the cutter mechanisms operate to cut swaths, the swath cut by the mower unit $M^1$ bridging or overlapping those cut by the mower units $M^2$ and $M^3$ for all angular positions.

When the draft bars 33 are directed toward the left, Fig. 1, the mower unit $M^1$ turns about the king bolt 35 with respect to the frame and with respect to the mower units $M^2$ and $M^3$ whose axes are fixed with respect to the frame. In moving to one side the rods 33, 33 carry with them the pivot shaft or pin 36 which also swings about the king bolt 35 as a center, with the result that the member 37 will be rotated about its pivot 36 and the connecting rods 39, 39 will be deflected in clockwise direction about their pivots 40, the regular quadrilateral formed of members 34, 39, 39 and 5 being distorted. There is in consequence transmitted through one of the rods 39 a pull upon its pivot 40 and through the other rod 39 a thrust upon its pivot 40, thereby compelling the frame and therefore the attached mower units $M^2$ and $M^3$ to also partake of an angular movement with respect to the prior straight forward path and so assist in taking a curvilinear path. The angular displacement of the frame and units $M^2$ and $M^3$ is less than the accompanying angular displacement of unit $M^1$.

The rods 39, 39 and their coöperating parts compel the mower units $M^2$ and $M^3$, the axes of whose driving wheels 9 are always in fixed relation with respect to the frame, that is, the units $M^2$ and $M^3$ do not swivel about vertical pivots, to operate as a unit and take an angular position with respect to the front or leading mower unit $M^1$ which is positively determined.

The result is that the two rows or ranks of mower units are compelled to assume predetermined angular relations with respect to each other when the gang mower takes a curvilinear path and cut a more even swath. For example, when either of the mower units of the rear rank, as for example the unit $M^3$, strikes a stone or a rut or other impediment the rear units will nevertheless be compelled to maintain their proper relation with respect to the leading unit and will the more readily ride over the impediment and preserve the original or desired path of travel. This will be understood by assuming the rods 39, 39 absent. In such case if the left hand wheel 9 of mower unit M³, Fig. 1, should strike a stone while the front mower unit is traveling straight forward in the direction of the arrow, there will be a tendency for that wheel 9 to stop and for the mower unit M² to move forwardly around the stone as a center and in so doing cut an irregular swath until the impediment is passed and then remain at or near such undesired angle, there being force exerted through the king bolt to restore them to normal position. With the rods 39, 39 and associated parts present, however, such erratic and irregular movements of one row with respect to another is prevented, and the two rows are maintained at all times in proper angular relations with respect to each other.

And by the arrangement described the swath cut by the leading mower M¹ will always overlap or join the swaths cut by the rear mower units, and the total width of swath is, with the construction of the character described, very great as regards the sum of the widths of the respective cutter mechanisms 10.

By preference the king bolt 35 is located midway or practically midway between the axes of the driving wheels of the units of the front and rear ranks.

What I claim is:

1. A gang mower comprising a frame, a plurality of individual lawn mowers disposed in different ranks, a mower of one of said ranks movable with respect to said frame about a vertical axis, the mowers of another rank being rigidly secured to said frame against swiveling movement, and means interconnecting said pivoted mower unit with said frame whereby definite angular movement of the different ranks with respect to each other is insured.

2. A gang mower comprising a frame, a plurality of individual lawn mowers disposed in different ranks, one of said ranks movable with respect to said frame about a vertical axis, another rank being rigidly secured against swiveling movement, and means interconnecting said pivoted rank with said other rank whereby angular movement of said pivoted rank compels angular movement of said other rank.

3. A gang mower comprising a frame, a plurality of individual lawn mowers disposed in different ranks, a mower of one of said ranks movable with respect to said frame about a vertical axis, the mowers of another rank being rigidly secured to said frame against swiveling movement, and levers pivoted to said frame and to said mower whereby angular movement of said mower compels angular movement of the mowers of the other rank.

4. A gang mower comprising a frame, a plurality of individual lawn mowers disposed in different ranks, a mower of one of said ranks movable with respect to said frame about a vertical axis, the mowers of another rank being rigidly secured to said frame against swiveling movement, a member pivoted to said mower at a distance from said vertical axis, and a lever pivoted to said member and to said frame, whereby angular movement of said mower compels angular movement of said frame and said mowers of said other rank.

5. A gang mower comprising a frame, a plurality of individual mower units disposed in different ranks, a draft member pivoted to said frame, a mower unit of one rank attached to said draft rigging and partaking of angular movement therewith, the mower units of another rank secured to said frame against swiveling movement, and mechanism pivoted to said frame and to said draft member at a distance from the pivotal connection of said draft member with said frame, whereby said draft member and frame are positively connected and simultaneously partake of angular movements.

6. A gang mower comprising a plurality of individual mower units disposed in different ranks, a frame with respect to which the mower units of a trailing rank are held against swiveling, a mower unit of a leading rank pivoted to said frame, and mechanism pivoted to said frame and to said last named unit at a distance from the pivotal connection of said unit to said frame, whereby said different ranks are compelled to partake of simultaneous angular movements.

7. A gang mower comprising a plurality of individual mower units disposed in different ranks, a frame with respect to which the mower units of a trailing rank are held against swiveling, a mower unit of a leading rank pivoted to said frame substantially midway between the ranks, and mechanism pivoted to said frame and to said last named unit at a distance from the pivotal connection of said unit to said frame, whereby said different ranks are compelled to partake of simultaneous angular movements.

8. A gang mower comprising a plurality of individual mower units disposed in different ranks, a frame with respect to which the mower units of a trailing rank are held against swiveling, a mower unit of a leading rank pivoted to said frame, and mechanism pivoted to said frame and to said last named unit at a distance from the pivotal connection of said unit to said frame, whereby said different ranks are compelled to partake of simultaneous angular movements of different extents.

9. A gang mower comprising a frame, a plurality of individual lawn mowers disposed in different ranks, a mower of one of said ranks movable with respect to said frame about a vertical axis non-coincident with the axis of the driving wheels of said mower, the mowers of another rank being rigidly secured against swiveling movement, and means interconnecting said pivoted mower with said frame whereby angular movement of said mower compels angular movement of said mowers of the other rank.

10. A gang mower comprising a frame, a plurality of individual lawn mowers disposed in different ranks, a mower of one of said ranks movable with respect to said frame about a vertical axis between said ranks, the mowers of another rank being rigidly secured against swiveling movement, and means interconnecting said pivoted mower with said frame whereby angular movement of said mower compels angular movement of said mowers of the other rank.

11. The combination with a lawn mower comprising lawn engaging wheels and cutter mechanism driven thereby, of a transverse bar, a draft bar, a horizontal pivot extending in the direction of movement of the lawn mower connecting said bar with said draft bar, and a member carried by said draft bar and embracing said bar for guiding and allowing movement of said bar upon said pivot.

12. A gang lawn mower comprising a plurality of individual mower units disposed in different ranks, a frame with respect to which the mower units of one rank are held against swiveling movement, a mower unit movable with respect to said frame about a vertical pivot, a bar pivoted on a vertical axis for movement with respect to said mower unit, and rigid members pivoted to said bar on opposite sides of its pivot and pivotally connected to said frame.

13. A gang lawn mower comprising a plurality of individual mower units disposed in different ranks, a frame with respect to which the mower units of one rank are held against swiveling movement, a mower unit movable with respect to said frame about a vertical pivot, a bar having movement about a vertical pivot disposed at a distance from said vertical pivot about which said mower unit moves, and rigid members pivoted to said bar at opposite sides of its pivot and pivoted to said frame on opposite sides of said vertical pivot about which said mower unit moves.

14. A gang lawn mower comprising a plurality of individual mower units disposed in different ranks, a frame with respect to which the mower units of one rank are held against swiveling movement, a draft member pivoted to said frame for movement about a vertical axis, a mower unit of another rank pivoted for transverse movement with respect to said draft member, a bar pivoted to said draft member for movement about a vertical axis, and members pivoted to said bar on opposite sides of its pivotal axis and pivoted at their other ends to said frame.

15. A gang lawn mower comprising a plurality of individual mower units disposed in different ranks, a frame with respect to which the mower units of one rank are held against swiveling movement, a cross bar, a mower unit of another rank secured to said cross bar, a draft member upon which said draft bar has pivotal movement about a horizontal axis, a bar having connection by a vertical pivot to said draft member, and rigid members pivoted to said last named bar on opposite sides of its pivotal axis and pivotally connected at their other ends to said frame.

In testimony whereof I have hereunto affixed my signature this 27 day of July, 1916.

WILLIAM F. H. BRAUN.